US009581083B2

(12) United States Patent
Anglin

(10) Patent No.: US 9,581,083 B2
(45) Date of Patent: Feb. 28, 2017

(54) SYSTEMS AND METHODS FOR SHOCK LOAD REDUCTION

(71) Applicant: United Technologies Corporation, Hartford, CT (US)

(72) Inventor: Christopher T. Anglin, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/660,555

(22) Filed: Mar. 17, 2015

(65) Prior Publication Data

US 2015/0292578 A1    Oct. 15, 2015

Related U.S. Application Data

(60) Provisional application No. 61/977,780, filed on Apr. 10, 2014.

(51) Int. Cl.
*F02C 7/36* (2006.01)
*G05G 5/24* (2006.01)
(Continued)

(52) U.S. Cl.
CPC ............... *F02C 7/00* (2013.01); *F01D 5/026* (2013.01); *F02C 7/36* (2013.01); *G05G 5/24* (2013.01); *F05D 2260/50* (2013.01)

(58) Field of Classification Search
CPC ........ F16D 65/02; F16D 41/22; F16D 43/202; F16D 41/063; F16D 41/16; F01D 5/026; F02C 7/36; F02C 7/00; G05G 5/08; G05G 5/12; G05G 5/18; G05G 5/24; B25B 13/463; Y10T 74/2133; Y10T 74/2136; Y10T 74/214; Y10T 74/2141; F05D 2260/50
See application file for complete search history.

(56) References Cited

U.S. PATENT DOCUMENTS 2,892,351 A * 6/1959 McCarty ................. G05G 5/18
                                                            56/364
2,971,621 A * 2/1961 Sinclair ................... F16D 23/10
                                                          192/109 R
(Continued)

FOREIGN PATENT DOCUMENTS

DE            112815         5/1975

OTHER PUBLICATIONS

Extended European Search Report dated Sep. 2, 2015 in European Application No. 15163141.3.

*Primary Examiner* — Adam D Rogers
(74) *Attorney, Agent, or Firm* — Snell & Wilmer L.L.P.

(57) ABSTRACT

A pawl carrier system comprising a pawl hub disposed substantially coaxially to a pawl carrier, a spring circumferentially disposed between the pawl hub and the pawl carrier, a pawl pivotably mounted to the pawl hub on a pivot joint, the pivot joint comprising an axially extending pin mounted to the pawl hub, wherein the axially extending pin extends through the pawl carrier and the pawl hub. A ratchet carrier system is provided comprising a ratchet carrier disposed substantially coaxially to a ratchet hub, wherein the ratchet hub comprises a ratchet tooth, a spring circumferentially disposed between the ratchet carrier and the ratchet hub and a retaining pin axially extending through the ratchet carrier and the ratchet hub.

8 Claims, 5 Drawing Sheets

(51) Int. Cl.
    *F02C 7/00*    (2006.01)
    *F01D 5/02*    (2006.01)

(56) References Cited

U.S. PATENT DOCUMENTS

| | | | | |
|---|---|---|---|---|
| 5,246,094 | A * | 9/1993 | Army | F02N 15/027 |
| | | | | 192/104 C |
| 5,257,685 | A | 11/1993 | Tichiaz et al. | |
| 7,877,845 | B2 * | 2/2011 | Signori | F16B 2/08 |
| | | | | 24/68 SK |
| 8,839,927 | B2 * | 9/2014 | Peterson | F16D 41/12 |
| | | | | 192/42 |
| 2015/0292577 | A1 * | 10/2015 | Anglin | F02C 7/00 |
| | | | | 74/577 R |
| 2015/0354407 | A1 * | 12/2015 | Anglin | F16D 41/12 |
| | | | | 188/82.77 |
| 2015/0361901 | A1 * | 12/2015 | Anglin | F02C 7/36 |
| | | | | 60/805 |

* cited by examiner

SYSTEMS AND METHODS FOR SHOCK LOAD REDUCTION

CROSS-REFERENCE TO RELATED APPLICATIONS

This application is a nonprovisional of, and claims priority to, and the benefit of U.S. Provisional Application No. 61/977,780, entitled "SYSTEMS AND METHODS FOR SHOCK LOAD REDUCTION," filed on Apr. 10, 2014, which is hereby incorporated by reference in its entirety.

FIELD

The present disclosure relates to systems and methods for shock load reduction, and more specifically, to systems and methods for shock load reduction applicable to ratchet and pawl systems.

BACKGROUND

Turbine engines typically windmill when idle. A turbine engine will often windmill due to wind blowing through the engine. Many times, wind enters through the engine outlet, causing the engine to windmill in reverse. Many turbine engines do not have a feature to prevent the reverse wind milling of the engine or utilize a complex and/or heavy system to accomplish this feature. Moreover, forward wind milling is often desired, for example, to enable the engine to more readily restart in flight. Reverse wind milling is not desired, for example, to reduce wear on the engine when idle. A turbine engine typically has a system to facilitate lubrication of rotating components when idle, but often this system only lubricates the rotating components when the engine is forward wind milling. Thus, reverse wind milling is often not desired. Certain reverse wind milling devices may introduce a large shock load, which would advantageously be avoided.

SUMMARY

In various embodiments, a pawl carrier system is provided comprising a pawl hub disposed substantially coaxially to a pawl carrier, a spring circumferentially disposed between the pawl hub and the pawl carrier, a pawl pivotably mounted to the pawl hub on a pivot joint, the pivot joint comprising an axially extending pin mounted to the pawl hub, wherein the axially extending pin extends through the pawl carrier and the pawl hub.

In various embodiments, a ratchet carrier system is provided comprising a ratchet carrier disposed substantially coaxially to a ratchet hub, wherein the ratchet hub comprises a ratchet tooth, a spring circumferentially disposed between the ratchet carrier and the ratchet hub and a retaining pin axially extending through the ratchet carrier and the ratchet hub;

In various embodiments, a method is provided comprising placing a load on a pawl, the pawl mounted to a pawl hub by an axially extending pin and compressing a spring by rotating the pawl hub, in response to the load, with respect to a pawl carrier.

In various embodiments, the pawl carrier system further comprises an axial aperture of the pawl carrier. In various embodiments, the axially extending pin extends through the aperture. In various embodiments, in response to a load placed upon the pawl, the spring compresses. In various embodiments, in response to the load, the axially extending pin may rotate circumferentially within the aperture. In various embodiments, the pawl carrier is rotationally driven by a shaft. In various embodiments, the retaining pin is fixedly mounted to the ratchet carrier. In various embodiments, the ratchet hub comprises an axial aperture through which the retaining pin extends. In various embodiments, the ratchet hub comprises an axial aperture through which the retaining pin extends. In various embodiments, in response to a load on the ratchet tooth, the ratchet hub rotates with respect to the ratchet carrier. In various embodiments, in response to a load on the ratchet tooth, the spring compresses. In various embodiments, in response to a load on the ratchet tooth, the retaining pin may rotate circumferentially through the aperture. In various embodiments, the retaining pin may contact a terminus of the aperture. In various embodiments, the method further comprises rotating the axially extending pin during the compressing within an aperture of the pawl carrier. In various embodiments, the method further comprises contacting the axially extending pin to a terminus of the aperture. In various embodiments, the spring is completely compressed during the compression. In various embodiments, the load is placed by contact between the pawl and a ratchet tooth. In various embodiments, the method further comprises rotationally driving the pawl carrier by a shaft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
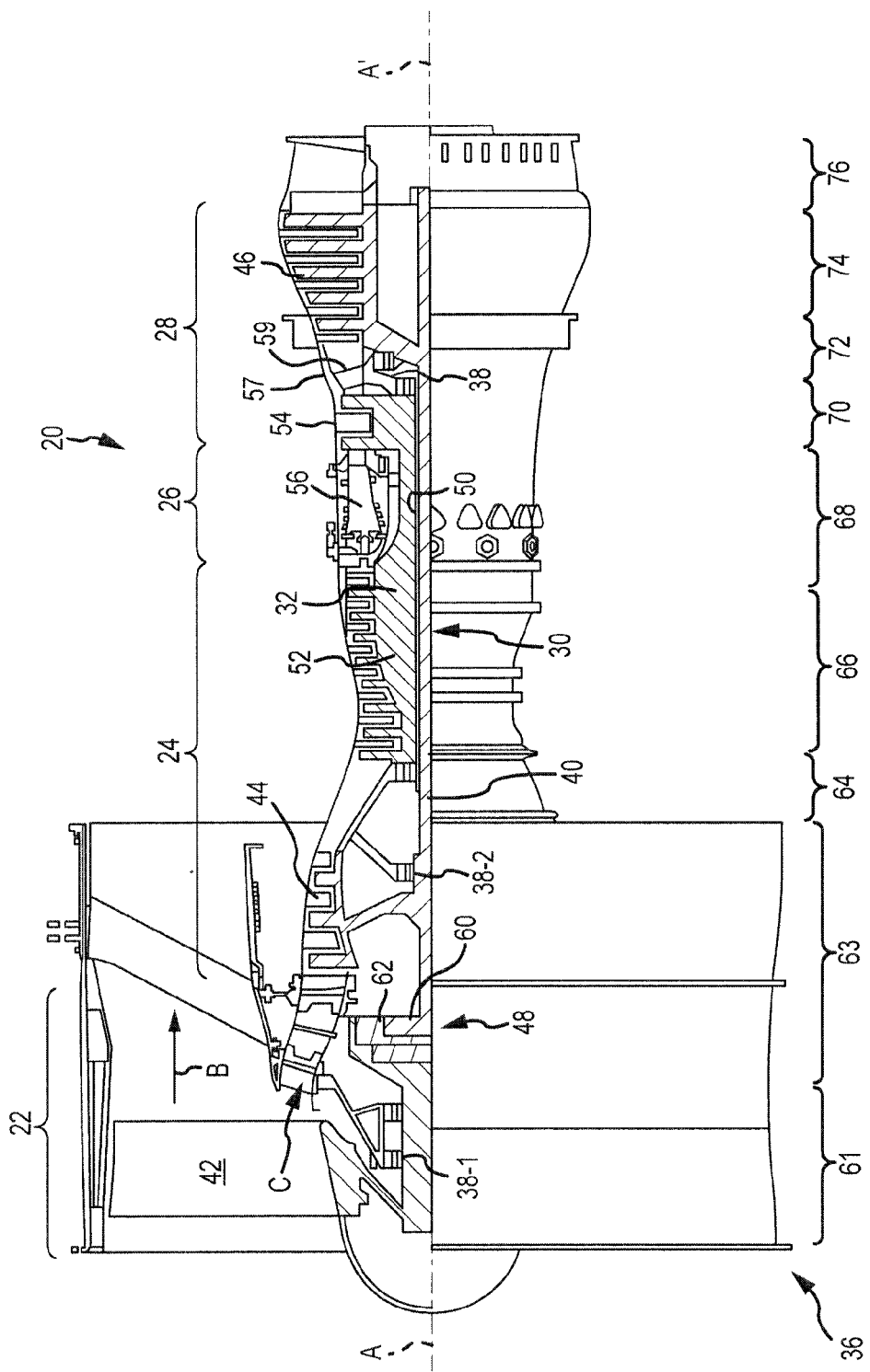
FIG. 1 illustrates a turbofan engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

With reference to FIG. 1, gas turbine engine 20 may generally include multiple of modules including for example, a fan case module 61, an intermediate case module 63, a Low Pressure Compressor (LPC) module 64, a High Pressure Compressor (HPC) module 66, a diffuser module 68, a High Pressure Turbine (HPT) module 70, a mid-turbine frame (MTF) module 72, a Low Pressure Turbine (LPT) module 74, and a Turbine Exhaust Case (TEC) module 76.

As described above, an anti-rotational device may be used to prevent reverse wind-milling in a turbofan engine. In particular, an anti-rotational device may be disposed in the low pressure turbine to prevent rotation in an undesired direction. For example, an anti-rotational device may be configured to allow rotation in a first direction (e.g., clockwise) and to limit all or nearly all rotation in a second direction (e.g., counter clockwise). Moreover, an anti-rotational device may be configured to limit mechanical contact at or above certain angular velocities. In that regard, lower angular velocities may be associated with a level of mechanical contact between various components but, after a low pressure turbine achieves a given angular velocity, the contact may be reduced or eliminated.

Figure 2:
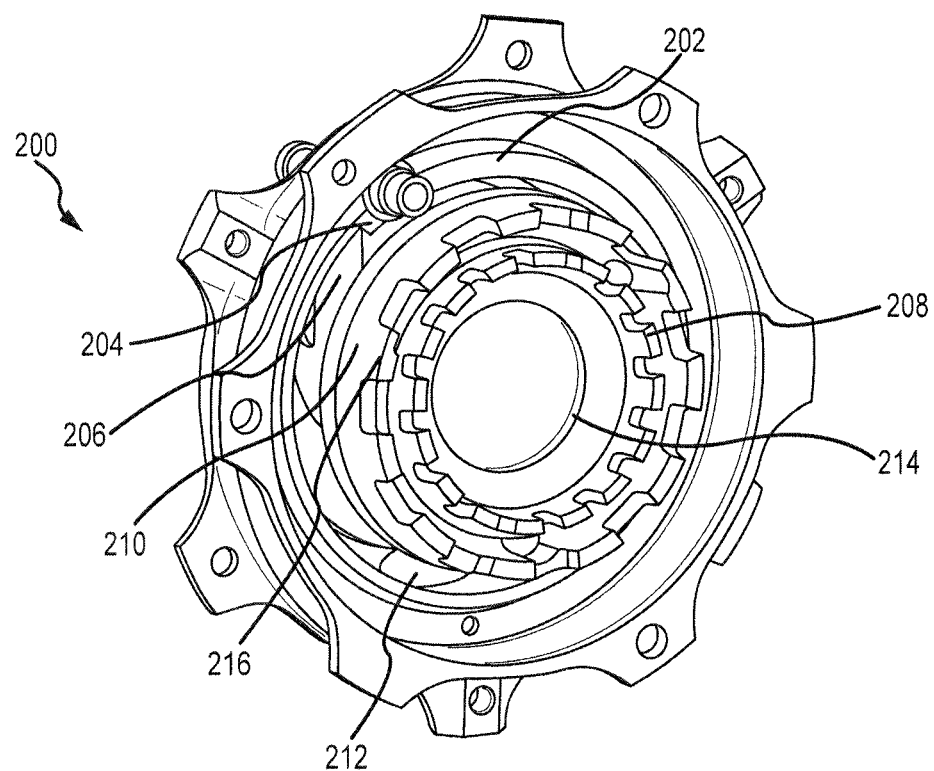
FIG. 2 illustrates an anti-rotation device according to various embodiments.

With reference to FIG. 2, anti-rotational device 200 is shown. Ratchet 202 is shown disposed coaxially to pawl carrier 210. Pawl carrier 210 is configured to rotate while ratchet 202 is constrained from rotation. Ratchet 202 has a variable radius. For example, the radius from the axis of rotation may vary in length along the inner circumference of ratchet 202. For example, the radius drawn near ratchet tooth 204 is smaller than the radius twenty degrees clockwise from ratchet tooth 204.

Pawl carrier 210 is configured to rotate within ratchet 202. Pawl carrier 210 is clamped by pawl nut 208 onto a central shaft 214. The central shaft may be driven by a motor or other device that may cause rotation of the central shaft. In various embodiments, the central shaft is a low pressure turbine shaft. Pawl nut 208 transfers torque to pawl carrier 210 and thus drives rotation of pawl carrier 210. Pawl carrier 210 is shown rotating in a clockwise direction.

Pawl hub 216 is shown substantially coaxial to pawl carrier 210. Pawls 206 and 212 are mounted to pawl hub 216, as shown in further detail herein. Pawls 206 and 212 are shown one hundred twenty (120) degrees apart along the circumference of pawl carrier 210. Pawls 206 and 212 may therefore rotate with pawl hub 216.

Pawls 206 and 212 may be comprised of any suitable material. For example, pawls 206 and 212 may be comprised of stainless steel such as 300 M stainless steel and/or chromium-nickel-tungsten martensitic alloy (also known as Greek Ascoloy). In various embodiments, various components disclosed herein may comprise 300 M stainless steel and/or chromium-nickel-tungsten martensitic alloy (also known as Greek Ascoloy) and/or austenitic nickel-chromium-based alloy such as Inconel® which is available from Special Metals Corporation of New Hartford, N.Y., USA, or any other high-temperature tolerant material, for example, titanium. However, in further embodiments, various components omay comprise other metals, such as tungsten, aluminum, steel, or alloys, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of anti-rotational devices as disclosed herein are made of different materials or combinations of materials, and/or may comprise coatings.

During clockwise rotation, pawl 206 contacts ratchet tooth 204, preventing further clockwise rotation. In operation, however, the contact between pawl 206 and ratchet tooth 204 may introduce a large shock load. To reduce such a shock load, springs or other compressive elements may be disposed between the pawl carrier and the pawl hub.

Figure 3:
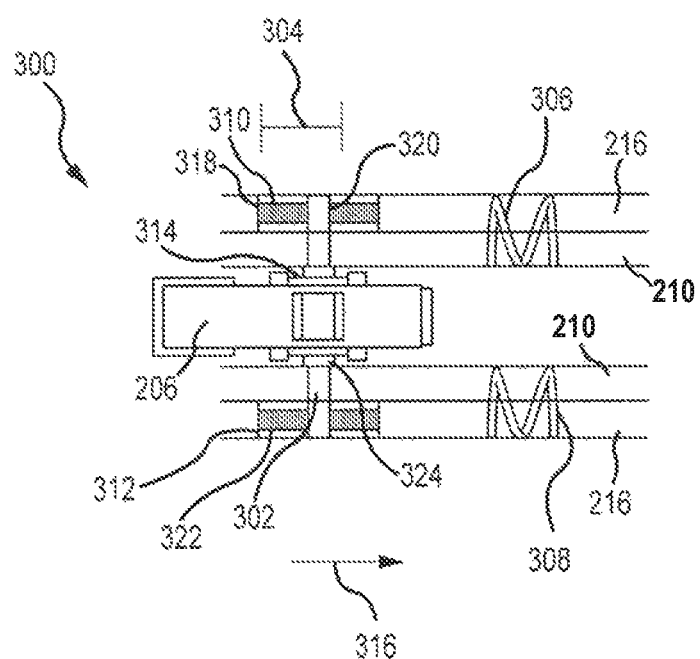
FIG. 3 illustrates a pawl hub according to various embodiments.

With reference to FIG. 3, view 300 of anti-rotational device 200 is shown. Pawl 206 is shown pivotably mounted to pawl carrier 210 on a pivot joint 314. Pivot joint 314 allows pawl 206 to rotate freely about pivot joint 314. Pivot joint 314 may comprise any suitable joint that is configured to allow pawl 206 to pivot. For example, a post and bushing mating may be used as pivot joint 314. Pivot joint 314 may be suitably lubricated, for example, using a solid state lubricant and/or liquid lubricant. Pivot joint 314 may also comprise one or more materials that are coated with or comprised of a low friction material. For example, portions of pivot joint 314 may be coated with polytetrafluoroethylene ("PTFE"). In various embodiments, pivot joint 314 is disposed at or near the geometric center of pawl 206.

Pivot joint 314 is shown mounted to axially extending pin 302. Axially extending pin 302 extends through axial aperture 310 and axial aperture 312 in pawl carrier 210 and is mounted to pawl hub 216. In that regard, axially extending pin 302 may be fixedly attached to pawl hub 216. For example, axially extending pin 302 may be, for example, welded, clamped, bolted, or made integral to pawl hub 216, though other joinery methods now known or hereinafter developed are contemplated herein. In various embodiments, axially extending pin 302 is removably attached to pawl huh 216. For example, axially extending pin 302 may be, for example, clamped or bolted to pawl hub 216.

As described above and shown, axially extending pin 302 extends through axial aperture 310 and axial aperture 312 in pawl carrier 210. Axial aperture 310 comprises first terminus 318 and second terminus 320, and axial aperture 312 comprises first terminus 322 and second terminus 324. During rotation of pawl hub 216 and pawl carrier 210, axially extending pin 302 may be in contact or may be proximate to but not in contact with second terminus 324 and/or second terminus 320. In response to pawl 206 striking a ratchet tooth, for example, pawl 206 may be forced in opposite direction 316 relative to pawl carrier 210. As pawl 206 rotates in direction 316, pawl 206 also causes pawl hub 216 to rotate in direction 316 due, for example, because axially extending pin 302 transfers force from pawl 206 to pawl hub 216. In that regard, springs 306 and 308 are compressed. Accordingly, energy is transferred into springs 306 and 308.

Springs 306 and 308 are disposed circumferentially about the pawl carrier 210 and the pawl hub 216. Springs 306 and 308 may comprise any suitable material, including stainless steel. Springs 306 and 308 may also possess a spring constant suitable to be compressed under load from pawl 206. Springs 306 and 308 may be mounted to both pawl carrier 210 and the pawl hub 216 using any suitable means. For example, springs 306 and 308 may be bolted, welded, or clamped to at least one of pawl carrier 210 and the pawl hub 216, though other joinery methods now known or hereinafter developed are contemplated herein. In various embodiments, at least one of springs 306 and 308 pawl carrier 210 is not fixedly attached to at least one of pawl carrier 210 and the pawl hub 216. In that regard, springs 306 and 308 may be allowed to be held in place by friction.

As pawl 206 rotates in direction 316, axially extending pin 302 may rotate through axial aperture 310 and axial aperture 312. Axially extending pin 302 may then travel to contact first terminus 318 and first terminus 322. At that point, axially extending pin 302's rotational path may be limited by first terminus 318 and first terminus 322. In various embodiments, axially extending pin 302's rotational path may be limited by springs 306 and 308.

Figure 4:
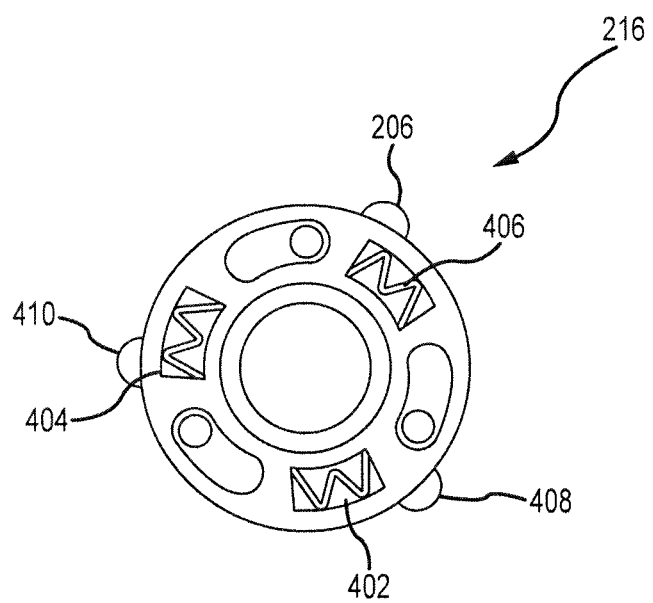
FIG. 4 illustrates a pawl hub according to various embodiments.

With reference to FIG. 4, pawl hub 216 is shown. Springs 404 and 402 are shown along with spring 406, which comprises springs 306 and 308. Springs 404 and 402 are each associated with pawls 410 and 408, respectively.

Figure 5:
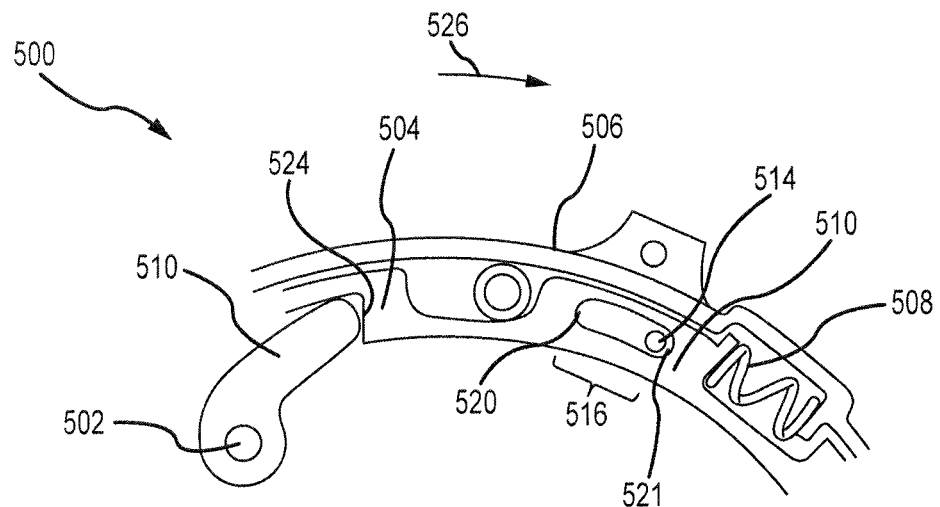
FIG. 5 illustrates a ratchet carrier and ratchet hub according to various embodiments.

With reference to FIG. 5, anti-rotational device 500 is shown. Pawl 510 is shown pivotably mounted to pawl carrier (not shown for clarity) on pivot joint 502. Pivot joint 502 allows pawl 510 to rotate freely about pivot joint 502. Pivot joint 502 may comprise any suitable joint that is configured to allow pawl 510 to pivot. For example, a post and bushing mating may be used as pivot joint 502. Pivot joint 502 may be suitably lubricated, for example, using a solid state lubricant and/or liquid lubricant. Pivot joint 502 may also comprise one or more materials that are coated with or comprised of a low friction material. For example, portions of pivot joint 502 may be coated with polytetrafluoroethylene ("PTFE"). In various embodiments, pivot joint 502 is disposed at or near the geometric center of pawl 510.

Ratchet carrier 506 is mounted coaxially or substantially coaxially to ratchet hub 504. Ratchet carrier 506 and ratchet hub 504 may be mounted for rotation about a common axis. Ratchet carrier 506 may comprise axially extending pin 514 that is fixedly attached to ratchet carrier 506. For example, axially extending pin 514 may be, for example, welded, clamped, bolted, or made integral to ratchet carrier 506, though other joinery methods now known or hereinafter developed are contemplated herein. In various embodiments, axially extending pin 514 is removably attached to ratchet carrier 506. For example, axially extending pin 514 may be, for example, clamped or bolted to ratchet carrier 506.

Spring 508 is disposed between ratchet carrier 506 and ratchet hub 504. In that regard, spring 508 is disposed circumferentially about ratchet carrier 506 and ratchet hub 504

As described above and shown, axially extending pin 514 extends through axial aperture 516 in ratchet hub 504. Axial aperture 516 comprises first terminus 520 and second terminus 521. During rotation of ratchet hub 504, axially extending pin 514 may be in contact or may be proximate to but not in contact with second terminus 521.

Figure 6:
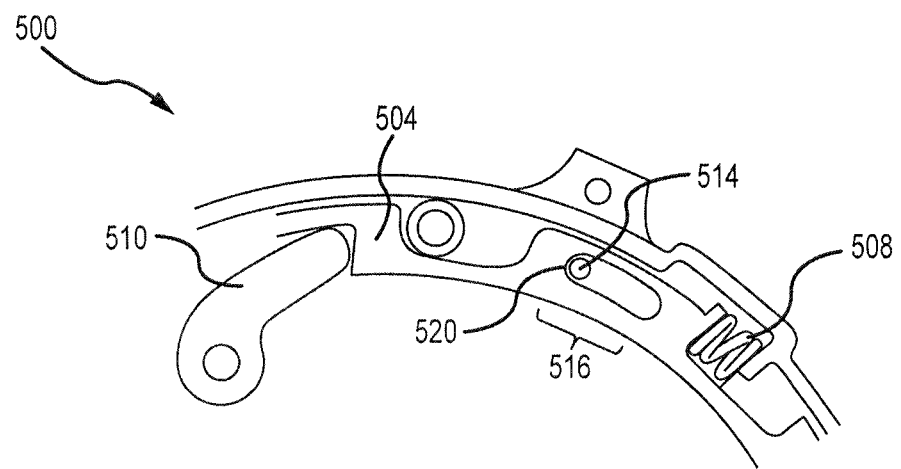
FIG. 6 illustrates ratchet carrier and ratchet hub to various embodiments.

Upon pawl 510 striking ratchet tooth 524 of ratchet hub 504, ratchet hub 504 may travel in direction 526. With reference to FIG. 6, anti-rotational device 500 is shown having compressed spring 508. In that regard, pawl 510 may cause ratchet hub 504 to rotate in a clockwise direction. Ratchet hub 504 may rotate as such so that axial aperture 516 rotates. In that regard, axially extending pin 514 may contact or nearly contact first terminus 520 of axial aperture 516. In such configuration, spring 508 absorbs a portion of the load imparted by pawl 510. Accordingly, the load imparted by pawl 510 is at least partially absorbed by spring 508.

The tuning of 308, 306, 402, 404, 406, and 408 may be adjusted to suit various design considerations, and it is contemplated that any spring may be utilized according to various embodiments. Hooke's law may be adapted for use in torsion springs and may take the form of:

$$F=kX$$

In this equation, F represents force exerted by the spring, X is the displacement of the spring relative to the resting position of the spring, and k is the spring constant. A spring of any spring constant may be used in various embodiments.

In that regard, Hooke's law may be used to find the force exerted by the spring and such information may be used to tune a ratchet hub or pawl hub to damp an anticipated load.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ratchet carrier system comprising:
    a ratchet carrier disposed coaxially to a ratchet hub, wherein the ratchet hub comprises a ratchet tooth;
    a spring circumferentially disposed between the ratchet carrier and the ratchet hub; and
    a retaining pin axially extending through the ratchet carrier and the ratchet hub,
        wherein the ratchet hub comprises an axial aperture through which the retaining pin extends,
        wherein, in response to a load on the ratchet tooth, the retaining pin is configured to rotate circumferentially through the aperture, and
        wherein the retaining pin is configured to contact a terminus of the aperture.

2. The ratchet carrier system of claim 1, wherein the retaining pin is fixedly mounted to the ratchet carrier.

3. The ratchet carrier system of claim 1, wherein, in response to the load on the ratchet tooth, the ratchet hub rotates with respect to the ratchet carrier.

4. The ratchet carrier system of claim 1, wherein, in response to the load on the ratchet tooth, the spring compresses.

5. A method comprising:
    placing a load on a pawl, the pawl mounted to a pawl hub by an axially extending pin;
    compressing a spring by rotating the pawl hub, in response to the load, with respect to a pawl carrier;
    rotating the axially extending pin during the compressing within an aperture of the pawl carrier; and
    contacting the axially extending pin to a terminus of the aperture.

6. The method of claim 5, wherein the spring is completely compressed during the compression.

7. The method of claim 5, wherein the load is placed by contact between the pawl and a ratchet tooth.

8. The method of claim 5, further comprising rotationally driving the pawl carrier by a shaft.

* * * * *